United States Patent
Shah et al.

(10) Patent No.: US 12,260,642 B2
(45) Date of Patent: Mar. 25, 2025

(54) COMPUTERIZED SYSTEM AND METHOD FOR FINE-GRAINED VIDEO FRAME CLASSIFICATION AND CONTENT CREATION THEREFROM

(71) Applicant: YAHOO AD TECH LLC, Dulles, VA (US)

(72) Inventors: Deven Santosh Shah, San Jose, CA (US); Avijit Shah, Santa Clara, CA (US); Topojoy Biswas, San Jose, CA (US); Biren Barodia, Milpitas, CA (US)

(73) Assignee: YAHOO AD TECH LLC, New York, NY (US)

( * ) Notice: Subject to any disclaimer, the term of this patent is extended or adjusted under 35 U.S.C. 154(b) by 532 days.

(21) Appl. No.: 17/560,386

(22) Filed: Dec. 23, 2021

(65) Prior Publication Data

US 2023/0206632 A1    Jun. 29, 2023

(51) Int. Cl.
*G06V 10/764* (2022.01)
*G06V 20/40* (2022.01)
*G06V 20/70* (2022.01)

(52) U.S. Cl.
CPC ............ *G06V 20/44* (2022.01); *G06V 10/764* (2022.01); *G06V 20/41* (2022.01); *G06V 20/70* (2022.01)

(58) Field of Classification Search
None
See application file for complete search history.

(56) References Cited

U.S. PATENT DOCUMENTS

| | | | |
|---|---|---|---|
| 2019/0377957 A1* | 12/2019 | Johnston | G06V 20/41 |
| 2020/0023262 A1* | 1/2020 | Young | G06N 3/044 |
| 2021/0004589 A1* | 1/2021 | Turkelson | G06V 30/19173 |
| 2022/0319016 A1* | 10/2022 | Graber | G06V 10/28 |

* cited by examiner

*Primary Examiner* — Idowu O Osifade
(74) *Attorney, Agent, or Firm* — James J. DeCarlo; Greenberg Traurig, LLP

(57) ABSTRACT

The disclosed systems and methods provide a novel framework that enables cost-effective, accurate and scalable detection and recognition of key events in sporting or live events. The framework functions by creating a domain-specific video dataset with frame level annotations (i.e., deep domain datasets) and then training a lightweight camera view classifier to detect camera views for a given video. The disclosed framework uses pre-trained pose estimation and panoptic segmentation models along with geometric rules as labeling functions to define scene types and derive frame level classification training data. According to some embodiments, disclosed frameworks may be used to identify key persons or events, select a thumbnail corresponding to a key person or event, generate personalized highlights to enhance user experience and social media promotions for a team, sport or players, and predict and select the best camera view sequence for automatic highlights generation.

20 Claims, 7 Drawing Sheets

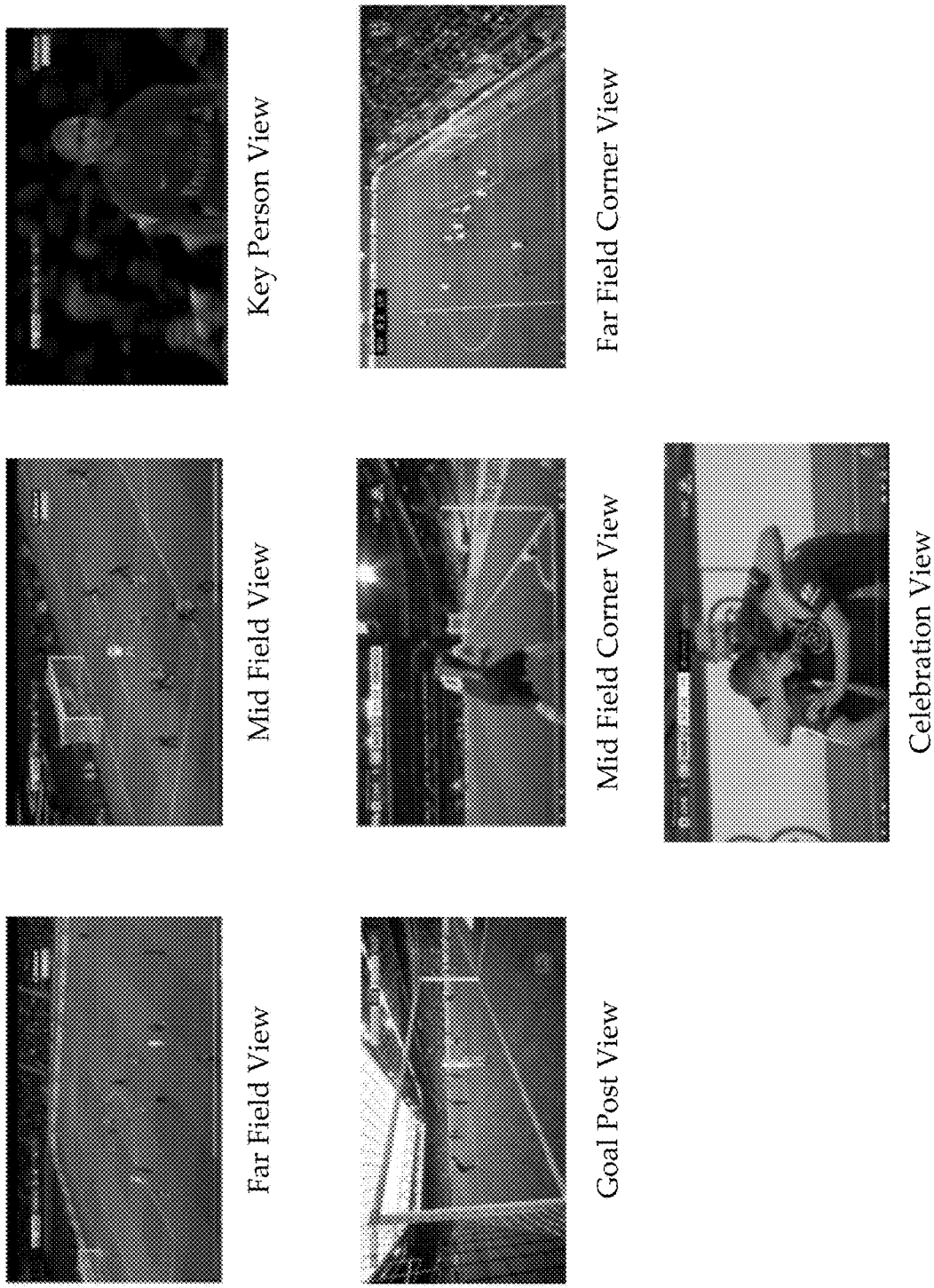

COMPUTERIZED SYSTEM AND METHOD FOR FINE-GRAINED VIDEO FRAME CLASSIFICATION AND CONTENT CREATION THEREFROM

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of network-based content hosting and delivery by modifying the capabilities of and providing non-native functionality to devices, systems and/or platforms in a network through a novel and improved framework for developing and training domain-specific camera view classification models and applying them to media for fine-grained event (or action) detection and recognition.

BACKGROUND

Fine-grained event recognition from content within videos depicting sports or performance events has been a challenging task due, in part, to the lack of domain specific fully annotated datasets. Most conventional approaches to developing training datasets require large amounts of computational resources in addition to human intervention resulting in increased costs and long development times. Even where datasets can be developed, key event detection and recognition remains a computationally intensive task.

SUMMARY

This disclosure provides a novel framework that alleviates shortcomings in the art, and provides mechanisms for performing cost-effective, accurate and scalable detection and recognition of user relevant key events (or actions, used interchangeably). According to the disclosed embodiments, the key events can be specific to a player (or actor or person or thing, used interchangeably), a league, type of event, team being represented (e.g., an affiliation), and the like, or combinations thereof.

Typically, highlight videos or main broadcast feeds of sporting event and live events (e.g., sporting events or live performances) combine several camera views from multiple pan-tilt-zoom ("PTZ") cameras feeds placed at different positions around the action to highlight key events. As a result, key events are typically portrayed in a specific sequence of camera views. Many of these videos (highlight videos in particular) are usually shared by the broadcaster without immediate payment restrictions or become available after the event has concluded. By determining and recognizing the camera views shown in a sequence and then determining the arrangement of camera views within the sequence, frameworks disclosed in accordance with embodiments described herein can detect and recognize a key event. In some embodiments, frameworks disclosed herein may detect and recognize key events from a sporting event across highlight videos.

According to disclosed embodiments, as discussed below, the framework functions by creating a domain-specific video dataset with frame level annotations (i.e., deep domain datasets) and then training a lightweight camera view classifier to detect camera views for a given video. The disclosed framework uses pre-trained pose estimation and panoptic segmentation models along with geometric rules as labeling functions to define scene types and derive frame level classification training data. According to some embodiments, by extracting frame level classification labels offline and using geometric rules applied on the outputs of the pre-trained pose estimation and panoptic segmentation models the disclosed framework reduces potentially costly feature map predictions as typically required in image segmentation or pose detections performed at runtime or prediction time.

According to some embodiments, the disclosed framework may be used to identify key persons, identify key moments in a sporting event, select a thumbnail corresponding to a key moment or a sporting event, or generate personalized multi-view video reels of a key event to enhance user experience as well as social media promotions for team, sports or players. According to some embodiments, the disclosed framework may be used to predict the best camera views for an event during live sports broadcasting which can reduce editorial burden of manually selecting appropriate views and avoid delays. According to some embodiments, the disclosed framework may be used to automatically selecting the best sequence of camera views for an event for automatic highlights generation and/or a personalized user experience.

However, as noted herein, domain-specific datasets (i.e., fully annotated datasets corresponding to a specific sport, league within a sport, or broadcaster) are not readily available and take significant resources at very high costs to create using traditional methods (i.e., through direct supervision or manual annotation). The disclosed framework builds domain-specific fully annotated datasets by starting with publicly available domain relevant videos and annotating the videos or relevant portions of the video at the frame or multiple frames level.

For purposes of this disclosure, licensed videos from entities (e.g., NBA®, NFL®, MLB®, NHL®, PGA®, and the like) will be used for exemplary purposes of disclosing the systems and methods of the novel framework; however, it should not be construed as limiting, as the disclosed framework can be applied to any type of media content, whether video or other forms of multi-media or images—for example, user generated content (UGC) on YouTube® or on social media sites, and the like.

Embodiments disclosed herein use off-the-shelf pre-trained models that are not domain specific (i.e., pre-trained models have been trained in datasets that encompass information far beyond the desired domain) to extract meaningful information from each frame. Then the framework applies predetermined geometric rules to the extracted information to generate frame level classification labels which are specific to the domain.

As such, the use of pre-trained models offers a cost-effective starting point on which to build a domain-specific dataset. Additionally, by deriving training knowledge from heavier/multi-layer pre-trained models which can predict feature maps, the overall framework requires less information and is ultimately less theoretically complex at runtime or prediction time. This allows for an overall smaller model that can be deployed to the edge (i.e., a user's device). For example, in the case of an end user receiving a broadcast stream of a sporting event from a content provider, the disclosed framework allows for the creation of user specific highlight reels at the user device level from the received broadcast stream. Currently, bandwidth limitations do not allow for multi-cam feeds of live events to be streamed to a user's device. Even in future high-bandwidth high-resource scenarios (e.g., more powerful user devices running on next generation mobile networks) where a user may receive multi-cam streams, the user will not be able to pay attention to each stream simultaneously. Therefore, embodiments disclosed herein allow for customization of the viewing experience for the user without additional bandwidth requirements or increased resource requirements. Personalization of the user experience can involve focusing the content shown on players the user is a fan of or on moments the user is more interested in (e.g., more frequent captures towards the end of the game, or when a goal is scored) such that the viewing time of the user can remain the same, but the variety of views from which they see a user relevant event becomes richer. In some embodiments, key event recognition as described herein allows for easy and efficient detection of the start and end times of a key event in a multi-cam stream. Once the start and end times are detected, relevant portions of each camera view stream can be extracted and used to automatically create a highlight reel.

Recognition and detection of key events as described herein has additional applications in the creation of content at the broadcaster level. Predicting the best camera views for a key event during a live broadcast allows for the automatic identification of the relevant camera feeds to allow producers of the sporting or live event to quickly direct the local feeds to the main broadcasting feed.

In accordance with one or more embodiments, the present disclosure provides computerized methods for a novel framework for developing and training domain-specific datasets with frame level annotations, training lightweight camera view classifier models based on the domain-specific dataset, and applying the camera view classifier to media for key event (or action) detection and recognition. In accordance with one or more embodiments, the present disclosure provides a non-transitory computer-readable storage medium for carrying out the above-mentioned technical steps of the framework's functionality. The non-transitory computer-readable storage medium has tangibly stored thereon, or tangibly encoded thereon, computer readable instructions that when executed by a device (e.g., application server, messaging server, email server, ad server, content server and/or client device, and the like) cause at least one processor to perform a method for a novel framework for developing and training domain-specific datasets with frame level annotations, training lightweight camera view classifier models based on the domain-specific dataset, and applying the camera view classifier to media for key event (or action) detection and recognition.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 7 illustrates camera view descriptions in accordance with some embodiments of the present disclosure.

DESCRIPTION OF EMBODIMENTS

Figure 1:
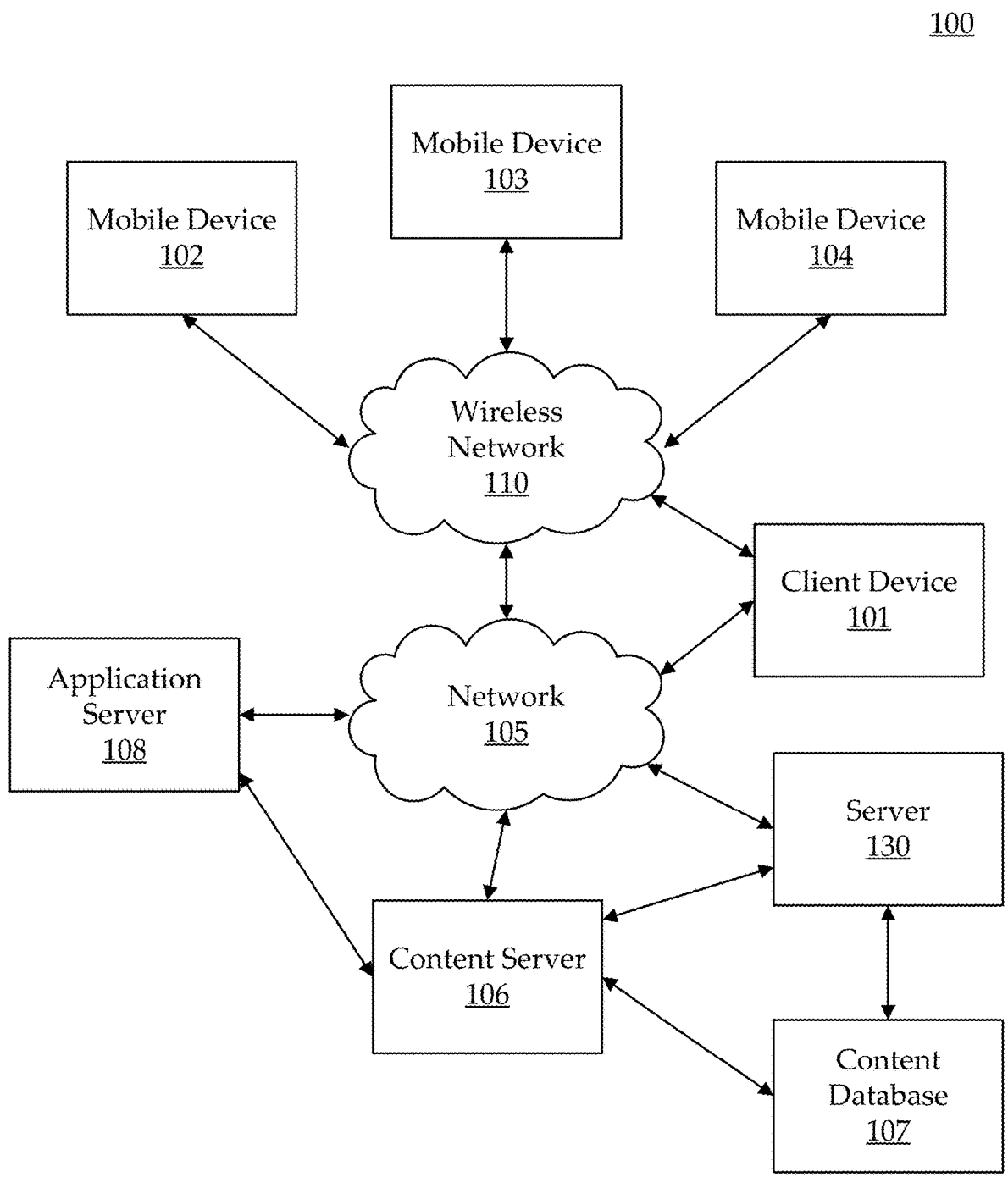
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the,"

again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, 4th or 5th generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108 and third party server 130.

One embodiment of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above.

Mobile devices 102-104 also may include at least one client application that is configured to receive content from another computing device. In some embodiments, mobile devices 102-104 may also communicate with non-mobile client devices, such as client device 101, or the like. In one embodiment, such communications may include sending and/or receiving messages, searching for, viewing and/or sharing memes, photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

Network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

The content server 106 may include a device that includes a configuration to provide any type or form of content via a network to another device. Devices that may operate as content server 106 include personal computers, desktop computers, multiprocessor systems, microprocessor-based or programmable consumer electronics, network PCs, servers, and the like. Content server 106 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like.

Third party server 130 can comprise a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user data. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is, advertisers will pay higher advertising rates when they believe their ads are being placed in or along with highly relevant content that is being presented to users. Reductions in the time needed to quantify a high-quality ad placement offers ad platforms competitive advantages. Thus, higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en-masse to advertisers. For web portals like Yahoo! ®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, and the like) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

In some embodiments, users are able to access services provided by servers 106, 108 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104.

In some embodiments, applications, such as, but not limited to, news applications (e.g., Yahoo! Sports®, ESPN®, Huffington Post®, CNN®, and the like), mail applications (e.g., Yahoo! Mail®, Gmail®, and the like), instant messaging applications, blog, photo or social networking applications (e.g., Facebook®, Twitter®, Instagram®, and the like), search applications (e.g., Yahoo!® Search), and the like, can be hosted by the application server 108, or content server 106 and the like.

Thus, the application server 108, for example, can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108 and/or 130.

Moreover, although FIG. 1 illustrates servers 106, 108 and 130 as single computing devices, respectively, the disclosure is not so limited. For example, one or more functions of servers 106, 108 and/or 130 may be distributed across one or more distinct computing devices. Moreover, in one embodiment, servers 106, 108 and/or 130 may be integrated into a single computing device, without departing from the scope of the present disclosure.

Figure 2:
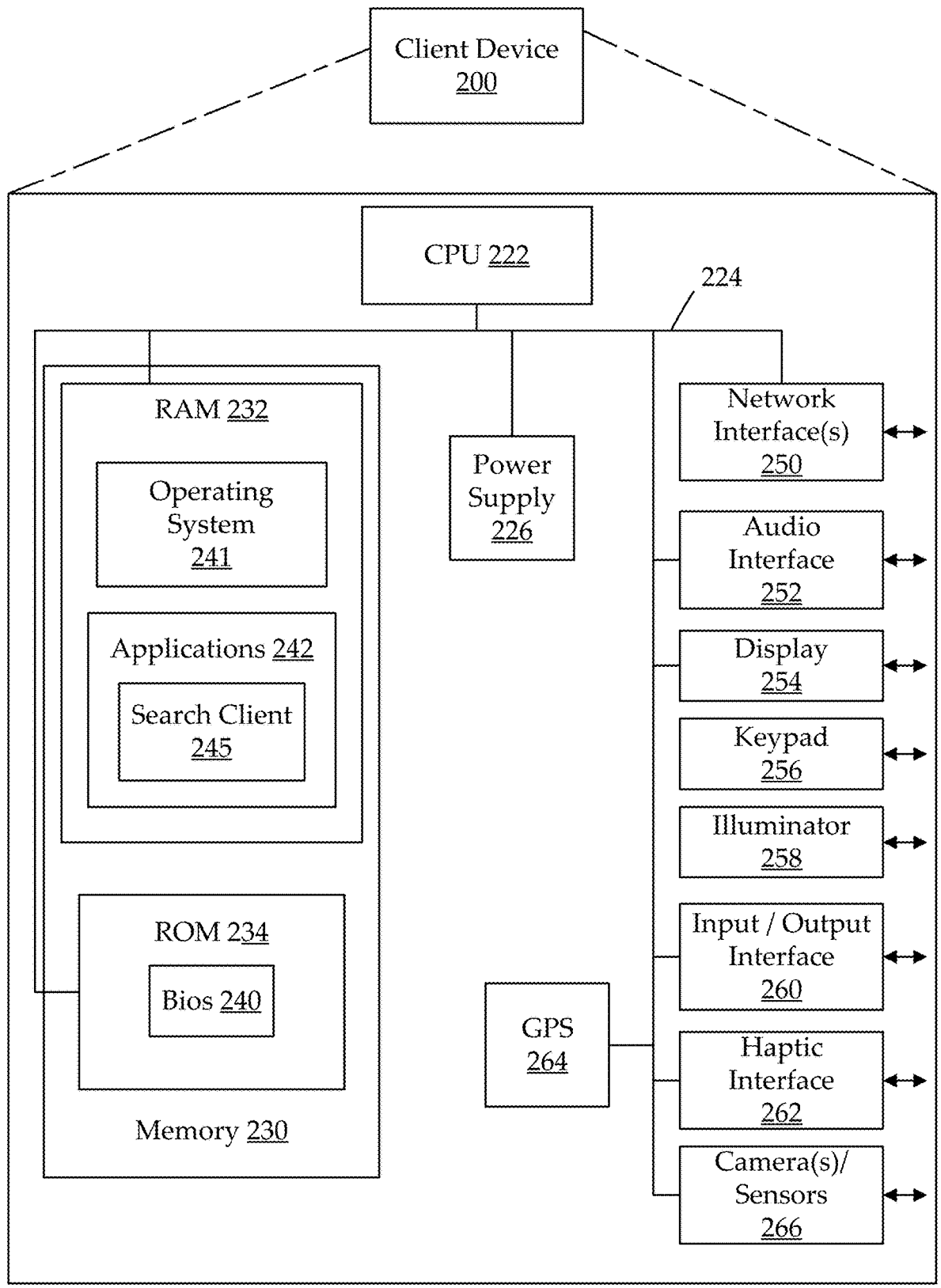
FIG. 2 is a schematic diagram illustrating an example of a client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. Power supply 226 provides power to Client device 200.

Client device 200 may optionally communicate with a base station (not shown), or directly with another computing device. Network interface 250 is sometimes known as a transceiver, transceiving device, or network interface card (NIC).

Audio interface 252 is arranged to produce and receive audio signals such as the sound of a human voice. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. Illuminator 258 may provide a status indication and/or provide light.

Client device 200 also comprises input/output interface 260 for communicating with external. Input/output interface 260 can utilize one or more communication technologies, such as USB, infrared, Bluetooth™, or the like. Haptic interface 262 is arranged to provide tactile feedback to a user of the client device.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200

Memory 230 further includes one or more data stores, which can be utilized by Client device 200 to store, among other things, applications 242 and/or other information or data. For example, data stores may be employed to store information that describes various capabilities of Client device 200. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Applications 242 may further include search client 245 that is configured to send, to receive, and/or to otherwise process a search query and/or search result.

Having described the components of the general architecture employed within the disclosed systems and methods, the components' general operation with respect to the disclosed systems and methods will now be described below.

Figure 3:
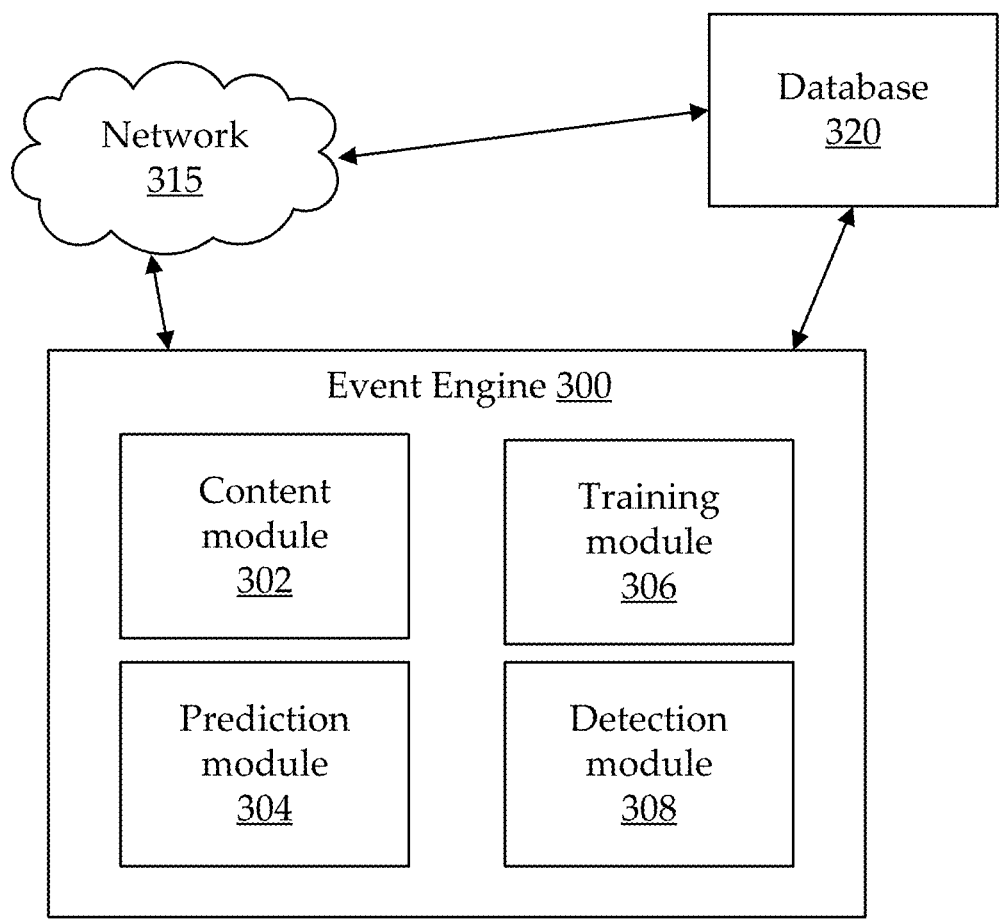
FIG. 3 is a block diagram illustrating components of an exemplary system in accordance with embodiments of the present disclosure.

FIG. 3 is a block diagram illustrating the components for performing the systems and methods discussed herein. FIG. 3 includes event engine 300, network 315 and database 320. The event engine 300 can be a special purpose machine or processor and could be hosted by a cloud server (e.g., cloud web services server(s)), messaging server, application server, content server, social networking server, web server, search server, content provider, third party server, user's computing device, and the like, or any combination thereof.

According to some embodiments, event engine 300 can be a stand-alone application that executes on a user device. In some embodiments, the event engine 300 can function as an application installed on the user's device, and in some embodiments, such application can be a web-based application accessed by the user device over a network. In some embodiments, portions of the event engine 300 function as an application installed on the user's device and some other portions can be cloud-based or web-based applications accessed by the user's device over a network, where the several portions of the event engine 300 exchange information over the network. In some embodiments, the event engine 300 can be installed as an augmenting script, program or application (e.g., a plug-in or extension) to another application or portable data structure.

The database 320 can be any type of database or memory, and can be associated with a content server on a network (e.g., content server, a search server or application server) or a user's device (e.g., device 101-104 or device 200 from FIGS. 1-2). Database 320 comprises a dataset of data and metadata associated with local and/or network information related to users, services, applications, content and the like.

In some embodiments, such information can be stored and indexed in the database 320 independently and/or as a linked or associated dataset. An example of this is a look-up table (LUT) illustrated in FIG. 4, as discussed below. As discussed above, it should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user patterns, user attributes, user preferences or settings, user demographic information, user location information, user biographic information, and the like, or some combination thereof. In some embodiments, the user data can also include user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data and metadata associated with users, messages, images, videos, text, products, items and services from an assortment of media, applications and/or service providers and/or platforms, and the like. Accordingly, any other type of known or to be known attribute or feature associated with a message, data item, media item, login, logout, website, application, communication (e.g., a message) and/or its transmission over a network, a user and/or content included therein, or some combination thereof, can be saved as part of the data/metadata in datastore 320.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the event engine 300, and the database of stored resources 320. Indeed, as illustrated in FIG. 3, the event engine 300 and database 320 can be directly connected by any known or to be known method of connecting and/or enabling communication between such devices and resources.

The principal processor, server, or combination of devices that comprise hardware programmed in accordance with the special purpose functions herein is referred to for convenience as event engine 300, and includes content module 302, prediction module 304, training module 306 and detection module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Figure 4:
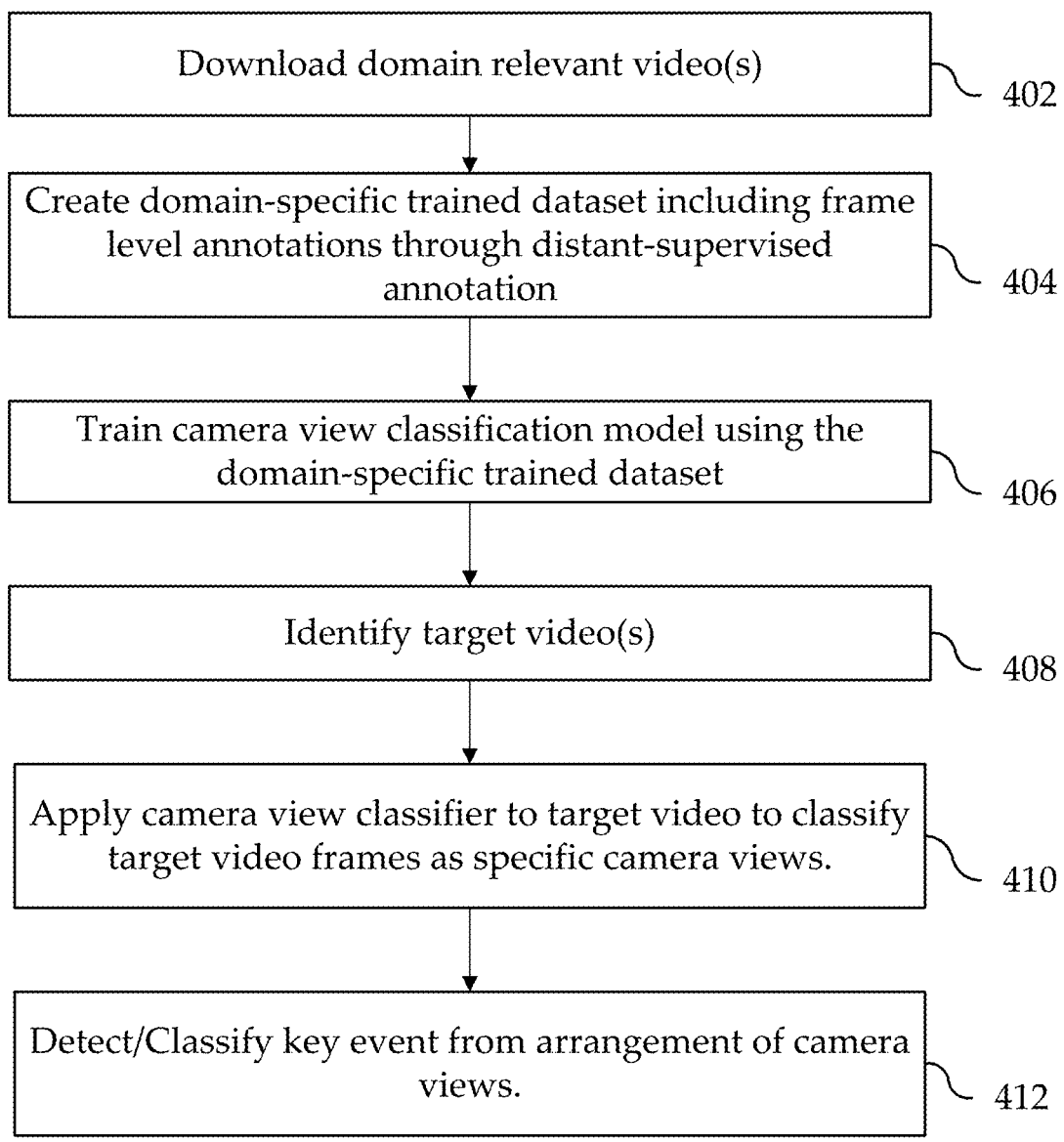
FIG. 4 illustrate non-limiting example embodiments of a data flow for performing key event recognition on an identified video(s) according to some embodiments of the present disclosure.

Turning to FIG. 4, process 400 details non-limiting embodiments for performing scalable detection and recognition of key events. In some embodiments, key events are relevant occurrences in a sporting event, artistic performance, or live event (i.e., a domain) that may be broadcast or streamed. For example, a key event (or type of key event) may be a touchdown, a tackle, a goal, a musician's solo, or an overtake maneuver in a racing event. As discussed herein, process 400 functions by creating a fully trained domain-specific dataset, using the dataset to train a lightweight camera view classifier, and detecting and recognizing a key event in a target video from a detected arrangement of camera views.

Process 400 of FIG. 4 begins with step 402 where a set of videos are identified and downloaded (e.g., training videos). These videos can be stored in a database (320) in association with engine 300, as discussed above in relation to FIG. 3. In some embodiments, a single video can be downloaded where the subsequent steps of process 400 can be applied thereto in a sequence with other videos; and in some embodiments, a plurality of videos can be downloaded as a batch operation, whereby the subsequently disclosed steps of process 400 are performed in a batch.

For purposes of this disclosure, the processing of a downloaded video from Step 402 will be in regard to a single video solely for clarity of explanation purposes, as one of ordinary skill in the art would readily recognize the applicability of engine 300's performance of process 400 (and its sub-steps) to a plurality of videos without departing from the scope of the instant disclosure.

As discussed above, the video downloaded in Step 402 is a licensed video clip from a third party provider—for example, for purposes of explanation only, a video clip hosted on YouTube® by the NBA® for a game played in the NBA® between the Milwaukee Bucks® and Washington Wizards®.

By way of background, almost all video content owners like NBA®, NFL®, NHL®, Formula 1 ®, UEFA Champions League®, and broadcasters like Bleacher Report®, Time Warner® and ESPN®, for example, have YouTube® channels that get readily updated with the highlight videos a few minutes after the game. YouTube has several resolutions of the videos—for purposes of this disclosure, however, YouTube's 720p resolution will be utilized. However, it should not be construed as limiting, as any value of resolution from a content hosting site, regardless of the site, can be leveraged for purposes of performing the disclosed systems and methods without departing from the scope of the instant disclosure.

For example, YouTube's 720p resolution mostly operates at 25 or 30 frames per second (fps). YouTube highlight videos are longer in duration, averaging 9-15 mins, and are crawled by parsing the JavaScript in the HTML page, which has dynamic URLs for each video resolution. Downloaded YouTube videos tend to not have any audio in the audio channel. However, they are double the time length of the original video. The visual channel remains intact, thus allowing engine 300 to analyze the video.

It should be understood that the disclosed systems and methods should not be construed to solely operate on or in accordance with videos' frame rates, as mentioned herein, as any frame rate, whether currently utilized or to be utilized in the future, can be leveraged according to the disclosed systems and methods without departing from the currently disclosed scope and functionality.

According to some embodiments, Step 402 involves a network bound operation being performed by engine 300 where a video(s) is downloaded from static MP4 uniform resource locators (URLs) identified from facets (e.g., metadata, attributes or deep linked data) of the video's content. For example, Step 402 can involve identifying a video on a network site (e.g., a video identifier (ID) on YouTube®), then parsing the video's Hypertext Markup Language (HTML) page to obtain at least one generated CDN URL of a full video associated with the video ID. In some embodiments the YouTube page and CDN URLs can be crawled periodically to discover new content, as well as determine video IDs, descriptions, titles, video length and publish data. In some embodiments, the videos being analyzed here are official videos for licensed content.

Figure 5:
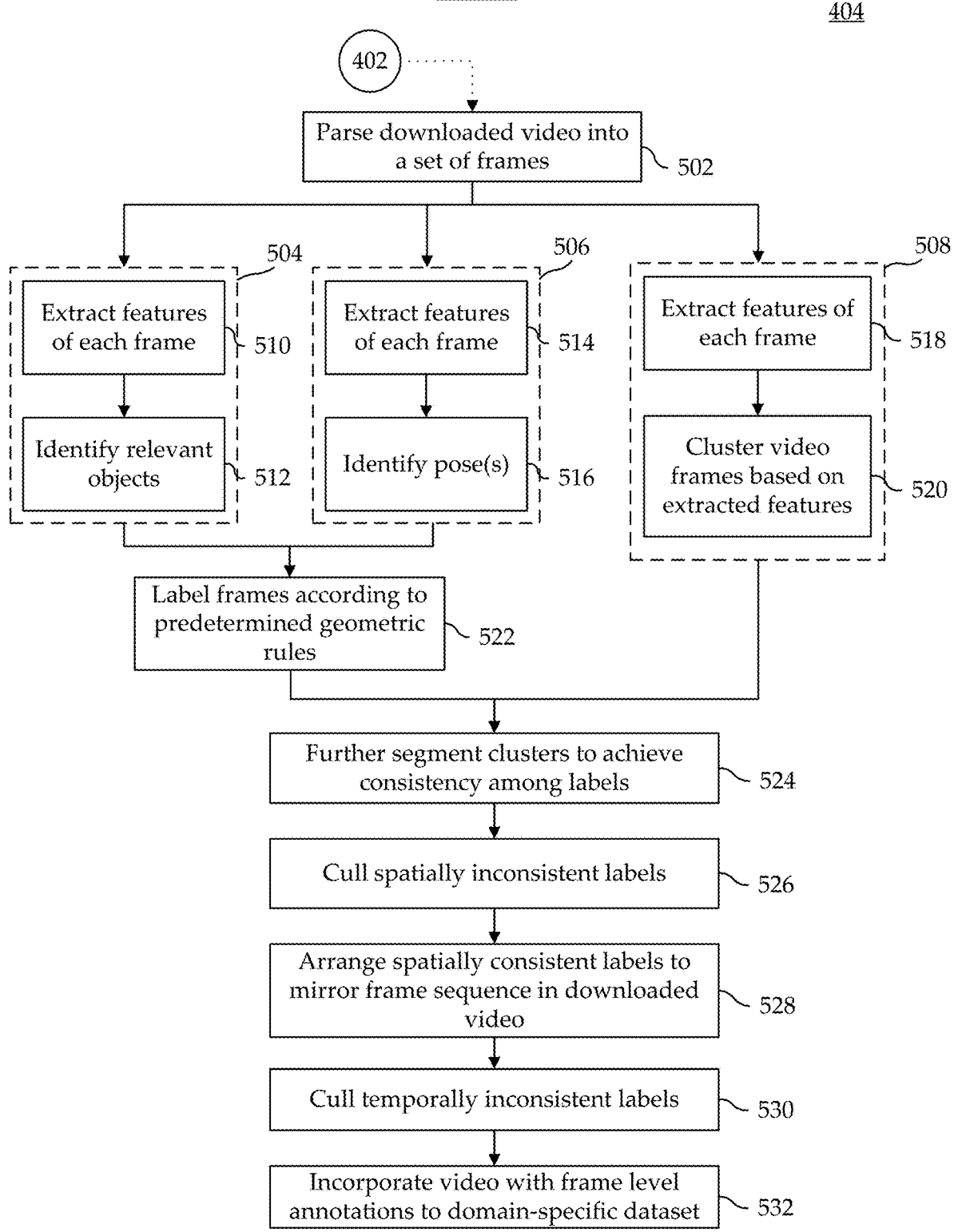
FIG. 5 details a non-limiting example embodiment of frame level annotation operations according to some embodiments of the present disclosure.

In Step 404, engine 300 performs distant-supervised frame level annotations on the downloaded video(s) (e.g., on the training videos) to generate a domain-specific dataset. As discussed herein, the downloaded video(s) in conjunction with off-the-shelf pre-trained (or "trained-in-the-wild") models may be utilized to construct a domain-specific (e.g., separate for NBA, NFL, NHL, Soccer, and the like), accurate, large training dataset without human intervention. In some embodiments, pre-trained models may be previously trained feature identification models. In some embodiments, pre-trained models may be previously trained feature mapping models. The operations of Step 404 are discussed in detail in FIG. 5, which provides blocks 502-532. As illustrated in FIG. 5, and discussed in detail below, Step 404 can involve the performance of blocks 502-532, as a portion or all of the determinations from blocks 502-532 can be performed as part of Step 404. According to some embodiments, the pose detection, panoptic segmentation, and clustering methods of Steps 504, 506, and 508, inter alia, are performed based on and utilizing off-the-shelf domain-agnostic models.

Turning to FIG. 5, the blocks of Step 404's distant-supervised frame level annotations on the downloaded video(s) from Step 402 are detailed. The blocks, which can be viewed as sub-steps of FIG. 5, are performed for each video identified and/or downloaded in Step 402. As mentioned above, a portion or all of the block/sub-steps can be performed.

In Step 502, the domain-relevant downloaded video(s) (i.e., training video) is parsed into image frames (i.e., training video frames) which are then used by the operations of blocks 504, 506, and 508.

In Step 504, engine 300 performs a panoptic segmentation operation based on a pre-trained panoptic segmentation model to identify relevant objects within the frame (e.g., people, players, a goal net, playing field, racing car). In an embodiment, in Step 510, engine 300 applies the model to each frame and, in Step 512, identifies relevant objects within the image. As will be noted, panoptic segmentation generally comprises predicting a value for each pixel in the frame to delineate relevant objects as curved areas in the frame. To achieve high-precision high-recall results panoptic segmentation models require large amounts of computational and storage resources due to their large size. Therefore, in some embodiments, the portion of the event engine 300 performing the panoptic segmentation operation of Step 504 is implemented on a web server, while the rest portions of event engine 300 performing other operations of Step 404 are implemented on a user's device. In some embodiments, the engine 300 uses a traditional or off-the-shelf panoptic segmentation model, such as the Detectron2 framework, trained on the Common Objects in Context ("COCO") dataset.

In Step 506, engine 300 performs a pose estimation operation based on a pre-trained pose estimation model to estimate poses for any persons within the frame. In an embodiment, in Step 514, engine 300 applies the model to each frame and, in Step 512, provides and estimation for any persons present within the frame. As will be noted, pose estimation generally comprises analyzing an image frame to yield a feature map for each body part. As a result, off-the-shelf pose estimation models can have multiple heavy layers and post prediction calculation of connecting joints predicted across different feature maps. Even the most minimalistic human body pose estimation algorithms yield at least 17 feature maps corresponding to 17 joints. Therefore, similar to panoptic segmentation models discussed herein, to achieve high-precision high-recall results pose estimation models require large amounts of computational and storage resources. In some embodiments, to allocate the required computational and storage resources the engine may be implemented over different devices exchanging information over a network. In some embodiments, the engine 300 uses a traditional or off-the-shelf pose estimation model, such as the Detectron2 framework, trained on the Common Objects in Context ("COCO") dataset.

In Step 522, the engine 300 performs a labeling operation to assign labels to each frame based on a pre-determined labeling function and the semantic information yielded by the panoptic segmentation process of Step 504 and the pose estimation model of Step 506. In an embodiment, the labels assigned to each frame correspond, at least in part, to a camera view of the frame.

In an embodiment, the labeling function consists of a set of geometric rules defining the elements present in each camera view. In some embodiments, a non-limiting labeling function uses the number of people in the frame, the area occupied by the people, and the presence of other contextual objects such as a goal post, a playing field, and the area covered by those objects to define a camera view. In some other embodiments, a non-limiting labeling function uses the pose of persons within the frame, the number of half bodies, the number of full bodies, as well as the spatial correlation between objects and persons. As a non-limiting example, in an embodiment where the frame relates to a soccer (i.e., football) match, the labeling function may label a frame as a "far-field camera view" if an identified net covers less than 5% of the frame, and a player size is less than 1% of the frame, and the player count is greater than 10. In some embodiments, the labeling function may be refined by adding or removing relevant objects or poses.

In some embodiments, the labeling operation in step 522 may result in inconsistent labels across at least some of the frames. Thus, in some embodiments, in Step 508, engine 300 performs an unsupervised clustering operation to cluster the frames based on extracted features. Then, in an embodiment, in step 524, the engine 300 may leverage the clustered outputs to identify spatially consistent labels across at least some of the frames. In some embodiments, the clustered output are used for smoothening the labels from the labeling function. In an embodiment, the clustering operation described in Step 508 can be broadly represented by Steps 518-520. In Step 518, engine 300 propagates the frame through an off-the-shelf pre-trained feature extraction model to extract features of each frame. In some embodiments, the unsupervised clustering operation uses a pre-trained backbone (e.g., a pre-trained feature extraction model) to encode each frame to an image embedding. In some embodiments, a pre-trained backbone is the VGG-16 convolutional network model proposed by K. Simonyan and A. Zisserman which comprises over 14 million images in 1000 classes to classify the image frames.

In Step 520, the image frames are hierarchically clustered based on the extracted features to create low variance clusters of similar frames (e.g., as coming from various highlight videos from different networks consisting of various key events). In some embodiments, such clustering may still result in large batch sizes, leading to out of memory (OOM) error in a graphics processing unit (GPU) of the device executing engine 300. Thus, in some embodiments, engine 300 can further slice groups by iteratively reducing the variance of the clusters by splitting them until the variance is less than a threshold limit.

As noted above, in some embodiments, the labels resulting from the labeling operation in Step 522 may be inconsistent across the clusters resulting from the clustering operation in Step 508. To achieve higher levels of label consistency across clusters, engine 300 can implement an additional clustering operation in Step 524. In an embodiment, the clustering operation of Step 524 involves: (1) splitting the cluster into buckets based on the size of the bucket, (2) dividing the frames in a cluster into four quartiles based on the distance of the frame from the centroid of the cluster, (3) removing the frames within the fourth quartile of each cluster (the removed frames are subject to re-clustering among outliers and across clusters), (4) calculating the variance of the cluster, (5) segmenting the cluster into more clusters based on whether the variance is higher than a threshold, (6) determining whether the variance of the cluster is greater than a predetermined threshold, (7) calculate the frequency of each camera view label in the cluster, (8) calculate the gap ratio based on the frequency of each camera view label in the cluster, (9) determine whether gap ratio is greater or less than a predetermined threshold for that bucket, and (10) if greater, resolve the labels of each image in that cluster to the majority label present in the cluster, (11) if lower, maintain the labels assigned by the labeling function in Step 522.

In some embodiments, the ascribed labels for a given frame may be spatially or temporally inconsistent with the labels of adjacent frames in the video (e.g., the labels are noisy or jittery). To achieve spatial and temporal consistency among labels of adjacent frames, in Steps 526-530, the engine 300 can compare the subject frame's labels with the labels of a number n of frames preceding and succeeding the subject frame. For example, in an embodiment, engine 300 can compare the labels of 6 frames to either side of the subject frame and determine whether at least 50% of the frames in the window have the same camera view label. If so, the label is retained, if not, the labeled may be removed. In some embodiments, prior to the cull operation in Step 530, engine 300 may perform Step 528 to arrange frames with spatially consistent labels to mirror, at least in part, the frame sequence in the downloaded video. While Steps 524, 526, 528 and 530 are shown in sequential order in FIG. 5, it will be understood that in different embodiments these steps may be performed in different order.

Thus, the blocks of Step 404, as outlined with reference to FIG. 5, result in the creation of a domain-specific dataset including frame level annotations that are utilized/leveraged to train models, as discussed below in relation to Step 406. In some embodiments, the frame level annotations correspond to camera view of the frame.

Turning back to FIG. 4, upon completion of Step 404 (and its sub-steps discussed above in relation to FIG. 5), Process 400 proceeds to Step 406, where a camera view classification model is trained. The training is based on the domain-specific dataset from Step 404 and its sub-steps. In some embodiments, some of the components of the camera view classification model are pre-trained using existing datasets. The operations of Step 406 are discussed in detail in FIG. 6 with respect to an embodiment of a camera view classification model. It will be noted that frameworks for camera view classification models vary significantly in complexity and resource requirements. The camera view classification model described with respect to Step 406 is non-limiting and merely represents one possible framework for camera view classification. In other embodiments, Step 406 may be performed using any camera view classification model capable of classifying a video segment using classifications corresponding to a specific domain.

Figure 6:
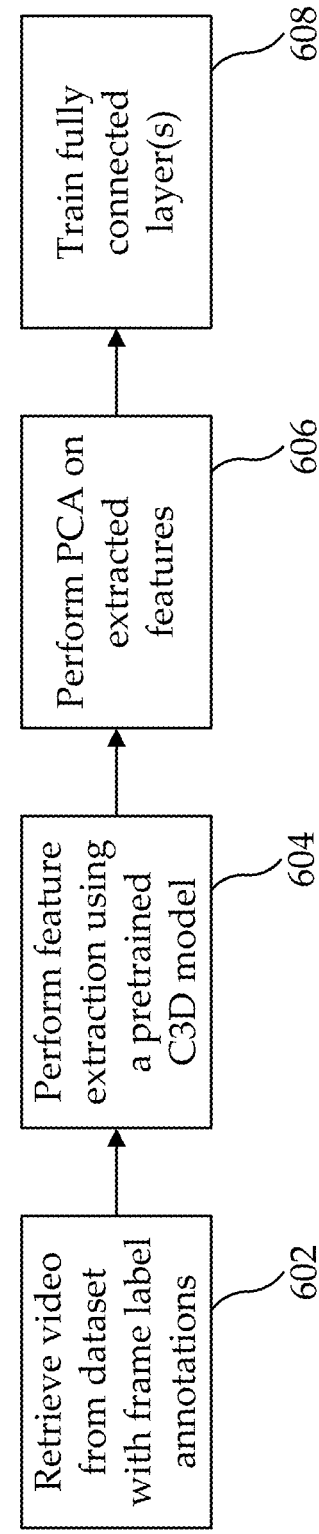
FIG. 6 illustrates a non-limiting example embodiment of a data flow for training a lightweight camera view classifier.

FIG. 6 provides blocks 602-608, illustrating steps for training a camera view classification model. As illustrated in FIG. 6, and discussed in detail below, Step 406 can involve the performance of blocks 602-608, as a portion or all of the determinations from blocks 602-608 can be performed as part of Step 406.

In Step 602, engine 300 retrieves a video segment or frame stack from the domain-specific dataset including frame level annotations created in Step 404. In an embodiment, the frame stack contains a predetermined number of frames. In other embodiments, the frame stack contains a number of frames corresponding to a predetermined video duration.

In an embodiment, in Step 604, the video clip is fed to a pre-trained Convolutional 3D ("C3D") neural network to extract features from the video. Some C3D models are well known in the art and are particularly effective in action and activity recognition applications. In some embodiments, the C3D model may be pretrained on a large-scale supervised video dataset such as the UCF-101 action recognition dataset and the Sports 1M dataset. In some embodiments, a C3D model takes an input video segment containing 16 frames—corresponding to a 0.5 second video and outputs a 4096-element vector.

In Step 606, engine 300 performs principal component analysis ("PCA") on the output of the C3D model. As will be noted, PCA is a dimensionality reduction technique that can be used to remove redundancy between correlated features in a dataset or vector. PCA allows for the distillation of large datasets into smaller more manageable vectors.

In Step 608, the vectors created through the PCA process are used to train layers—which may be fully connected layers—of a neural network which is part of the camera view classification model. Thus, the blocks of Step 406, as outlined with reference to FIG. 6, result in the creation of a lightweight camera view classifier.

Turning back to FIG. 4, upon completion of Step 404 (and its sub-steps discussed above in relation to FIG. 5), Process 400 proceeds to Step 406, where a target video is identified and passed to the camera view classifier trained in Step 406.

In Step 410, engine 300 uses the camera view classifier to classify frames or segments of the target video as a camera view type (e.g., far field views, mid field views, close-up key person view, goal post view, mid field corner view, far field corner view, close-up celebration view, transition frame, or informational views) described in more detail with respect to FIG. 7.

Once the camera views of the target video have been identified, Process 400 proceeds to Step 412 to recognize the key event from the arrangement of camera views. As will be noted, different broadcasters highlight different key events using unique camera view arrangements. Examples of different camera arrangements for soccer matches are shown in Table 1.

TABLE 1

Camera views for key events in soccer matches.

| Broadcaster | Key Event | Camera Views in Order |
|---|---|---|
| NBC Sports ® - Premier League ® | Goal | far field view |
| | | mid field view |
| | | close-up of celebration view |
| | Goal Attempt/ Block/Miss: | far field view |
| | | mid field view |
| | | close-up of key person view |
| | Corner: | far field view |
| | | mid field view |
| | | far field view |
| | | close-up of key person view |
| | | (alternatively mid field view) |
| | | far field view |
| | | mid field view |
| | | close-up of key person view |
| Bleacher Report ® Football - Champions League ® | Goal | far field view |
| | | close-up of celebration view |
| | Goal Attempt/ Block/Miss: | far field view |
| | | mid field view |
| | | close-up of key person view |
| | Penalty | mid field view |
| | | far field view |
| | | close-up of key person view |
| | Corner: | mid field view |
| | | far field view |
| | | mid field |
| | | close-up of key person view |

In some embodiments, in Step 412, engine 300 uses webly supervised data independently available for various key events like goals, yellow card, penalty kicks to classify, at least in part, the target video. In some embodiments, the engine 300 may use a statistical model to understand the order of frames associated with a key event and formulate them into rules, then the key event can be detected and recognized using the camera view prediction from Step 410 and the formulated rules using the statistical model. In some embodiments, engine 300 also determines start and end times for the key event.

An aspect of the present disclosure is a model to select the next camera view to display in an arrangement of camera view highlighting a key event (e.g., to aid producers of sporting and live events in the production of the broadcast). By treating generated camera view annotations from highlight videos or event broadcast videos as a sequence of annotations and then fitting a sequential model to predict the next best camera view to select from multi-camera streams, engine 300 can pre-select which video segments should be used and in what order to automatically or semi-automatically created a video sequence.

Another aspect of the present disclosure is a method of creating a highlight video of a known key event. In an embodiment, a plurality of videos (e.g., from different cameras having different camera views) corresponding to a key event may be analyzed to determine a camera view corresponding to each of the videos. In some embodiments, the camera view may be determined according to methods disclosed herein. In other embodiments, the videos may be pre-annotated with the corresponding camera view.

In some embodiments, the highlight video is created by placing at least some of the videos (i.e., relevant videos) depicting the key event in a specific sequence according to the corresponding camera view of the video. In some embodiment, as disclosed elsewhere herein, the sequence of camera views that may be displayed in a highlight video depicting a known key event may be predetermined. In other embodiments, only portions of some of the relevant videos may be selected and used to create the highlight video.

Turning now to FIG. 7, example of camera views for a sporting event are shown. Each camera view has specific characteristics that may be used in the formulation of the geometric rules (i.e., the labeling function) of Step 404. The following provide for non-limiting descriptions of camera view classifications:

far field view depicts the playing field from a far depth having area covered by the players not more than 2.85% of the frame, and area covered by playing field is greater than 50%.

mid field view depicts the close view of the people showcasing the actions made by players in more detail than the far field view. It may be a slow-motion view or a zoomed in view. It has a playing field covering an area not more than 4% of the entire frame, players covering an area more than 2.85% but less than 12% and if goal post is present then the area covered by the goal post should be greater than 4%.

close-up key person view depicts close-up view or out-of-field views capturing a player, coach, or referee after an event occurs. Playing field is normally not present in this camera view type, and only a half body is shown. The area covered by the half body of the person is typically greater than 12% of the view.

close-up celebration view depicts a close-up view or out-of-field view views, capturing players, audiences, coaches celebrating after an event occurs. Only half bodies are shown, and the area covered by the half bodies should be greater than 40%. The playing field is typically not present in the frame.

An aspect of the present disclosure is a method including identifying, by a device, a video depicting a key event, the video having a plurality of frames; extracting, by the device, a sequence of frames from the plurality of frames; determining, by the device, a camera view for each frame of the sequence of frames to form a sequence of camera views; and determining, by the device, a type of key event from the sequence of camera views.

Another aspect of the present disclosure is a computing device including a processor configured to identify a video depicting a key event, the video having a plurality of frames, extract a sequence of frames from the plurality of frames, determine, using a lightweight classification model, a camera view for each frame of the sequence of frames, the camera views of the sequence of frames forming a sequence of camera views; and determine, a type of key event from the sequence of camera views.

Yet another aspect of the present disclosure is a method of creating a highlight video of a known key event, the method including receiving, by a device from a server, a plurality of videos depicting the key event; determining, by the device, using a lightweight classification model, a camera view for each video of the plurality of videos; selecting, by the device, a set of relevant videos from the plurality of videos based on the determined camera view; and arranging, by the device, each video from the set of relevant videos in a sequence based on the camera views and the known key event.

Still another aspect of the present disclosure is a method of creating a domain-specific video dataset, the method including retrieving, by a device, a training video depicting a key event from a first database, the video having a plurality of training video frames; applying, by the device, a previously trained feature identification model to each of the training video frames to identify at least one feature of the training video frame; applying, device at least one geometric rule to the at least one feature of the training video frame to determine a label of the training video frame; determining, by the device, from the at least one label, a camera view corresponding to the training video frame; and storing, by the device, the training video and an associated annotation corresponding to the determined camera view of each of the plurality of training video frames.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   identifying, by a device, a video depicting a key event, the video having a plurality of frames;
   extracting, by the device, a sequence of frames from the plurality of frames;
   determining, by the device, a camera view for each frame of the sequence of frames to form a sequence of camera views by applying a pre-trained panoptic segmentation model to identify relevant objects within the frame;
   applying a pre-trained pose estimation model to estimate poses for any persons within the frame;
   assigning a label to the frame based on a predetermined labeling function and semantic information yielded by the panoptic segmentation model and the pose estimation model; and
   determining, by the device, a type of key event from the sequence of camera views by comparing the sequence of camera views to predetermined arrangements of camera views associated with different types of key events.

2. The method of claim 1, wherein determining a camera view for each frame of the sequence of frames further comprises analyzing each frame using a lightweight classification model.

3. The method of claim 2, wherein the lightweight classification model is trained on a domain-specific video dataset.

4. The method of claim 3, wherein the domain-specific video dataset is created by performing steps comprising:
   retrieving a training video from a database, the training video having a plurality of training video frames;
   applying a previously trained feature identification model to each of the training video frames to identify at least one feature of the training video frame;
   applying at least one geometric rule to the at least one feature of the training video frame to determine a label of the training video frame; and
   determining from the at least one label, a camera view corresponding to the training video frame.

5. The method of claim 4, wherein the previously trained feature identification model comprises a panoptic segmentation model.

6. The method of claim 4, wherein the previously trained feature identification model comprises a pose estimation model.

7. The method of claim 4, wherein the at least one geometric rule is predetermined according to a domain of the domain-specific video dataset.

8. The method of claim 4, wherein the previously trained feature identification model was trained using a domain-agnostic training dataset.

9. The method of claim 1, further comprising determining from the sequence of camera views a start time and an end time of the key event.

10. A computing device comprising:
a processor configured to:
identify a video depicting a key event, the video having a plurality of frames;
extract, a sequence of frames from the plurality of frames;
determine, using a lightweight classification model, a camera view for each frame of the sequence of frames, the camera views of the sequence of frames forming a sequence of camera views the lightweight classification model comprising a pre-trained panoptic segmentation model to identify relevant objects within the frame;
applying a pre-trained pose estimation model to estimate poses for any persons within the frame;
assigning a label to the frame based on a predetermined labeling function and semantic information yielded by the panoptic segmentation model and the pose estimation model; and
determine, a type of key event from the sequence of camera views by comparing the sequence of camera views to predetermined arrangements of camera views associated with different types of key events.

11. The device of claim 10, wherein the processor is configured to train the lightweight classification model on a domain-specific video dataset.

12. The device of claim 11, further comprising a memory containing a database; and wherein the processor is further configured to create the domain-specific video dataset by:
retrieving, a training video from the database, the training video having a plurality of training video frames;
applying, a previously trained feature identification model to each of the training video frames to identify at least one feature of the training video frame;
applying, at least one geometric rule to the at least one feature of the training video frame to determine a label of the training video frame; and
determining, from the at least one label, a camera view corresponding to the training video frame.

13. The device of claim 12, wherein the previously trained feature identification model comprises a panoptic segmentation model.

14. The device of claim 12, wherein the previously trained feature identification model comprises a pose estimation model.

15. A non-transitory computer-readable storage medium for tangibly storing computer program instructions capable of being executed by a computer processor, the computer program instructions defining steps of:
identifying, by a device, a video depicting a key event, the video having a plurality of frames;
extracting, by the device, a sequence of frames from the plurality of frames;
determining, by the device, a camera view for each frame of the sequence of frames to form a sequence of camera views by applying a pre-trained panoptic segmentation model to identify relevant objects within the frame;
applying, by the device, a pre-trained pose estimation model to estimate poses for any persons within the frame;
assigning, by the device, a label to the frame based on a predetermined labeling function and semantic information yielded by the panoptic segmentation model and the pose estimation model; and
determining, by the device, a type of key event from the sequence of camera views by comparing the sequence of camera views to predetermined arrangements of camera views associated with different types of key events.

16. The non-transitory computer-readable storage medium of claim 15, wherein determining a camera view for each frame of the sequence of frames further comprises analyzing each frame using a lightweight classification model.

17. The non-transitory computer-readable storage medium of claim 16, wherein the lightweight classification model is trained on a domain-specific video dataset.

18. The non-transitory computer-readable storage medium of claim 17, wherein the domain-specific video dataset is created by performing steps comprising:
retrieving a training video from a database, the training video having a plurality of training video frames;
applying a previously trained feature identification model to each of the training video frames to identify at least one feature of the training video frame;
applying at least one geometric rule to the at least one feature of the training video frame to determine a label of the training video frame; and
determining from the at least one label, a camera view corresponding to the training video frame.

19. The non-transitory computer-readable storage medium of claim 18, wherein the previously trained feature identification model comprises one of a panoptic segmentation model and a pose estimation model.

20. The non-transitory computer-readable storage medium of claim 15, the steps further comprising determining from the sequence of camera views a start time and an end time of the key event.

* * * * *